(12) United States Patent
Kidooka et al.

(10) Patent No.: US 7,631,573 B2
(45) Date of Patent: Dec. 15, 2009

(54) GUIDING DEVICE FOR AN UMBILICAL MEMBER OF A ROBOT AND A ROBOT HAVING THE GUIDING DEVICE

(75) Inventors: Akio Kidooka, Yamanashi (JP); Masahiro Morioka, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 531 days.

(21) Appl. No.: 11/290,462

(22) Filed: Dec. 1, 2005

(65) Prior Publication Data

US 2006/0117896 A1  Jun. 8, 2006

(30) Foreign Application Priority Data

Dec. 2, 2004  (JP)  .............................. 2004-349957

(51) Int. Cl.
*B25J 17/00* (2006.01)
(52) U.S. Cl. ................................. 74/490.02; 74/490.06
(58) Field of Classification Search .............. 74/490.01, 74/490.02, 490.03, 490.05, 490.06; 901/15, 901/41; 414/918; 219/132, 136, 137 R, 219/137.2, 137.9
See application file for complete search history.

(56) References Cited

U.S. PATENT DOCUMENTS 7,104,153 B2 * 9/2006 Matsumoto et al. ...... 74/490.02

FOREIGN PATENT DOCUMENTS

| EP | 1243384 A1 | * | 9/2002 |
|---|---|---|---|
| EP | 1457295 A1 | | 9/2004 |
| JP | 7-124886 | | 5/1995 |
| JP | 10-166292 | | 6/1998 |
| JP | 2001-150382 | | 6/2001 |
| JP | 2001310289 | * | 11/2001 |
| JP | 2003-136462 | | 5/2003 |
| JP | 2003136462 A | * | 5/2003 |
| JP | 2003-311672 | | 11/2003 |
| JP | 2004-050369 | | 2/2004 |

* cited by examiner

*Primary Examiner*—Richard W L Ridley
*Assistant Examiner*—Phillip Johnson
(74) *Attorney, Agent, or Firm*—Drinker Biddle & Reath LLP

(57) ABSTRACT

A guiding device, with high rigidity, for an umbilical member and a robot having the guiding device, by which interference between the umbilical member and another component or external equipment is minimized. The guiding device or an adaptor includes a first plate member fixed to a third wrist element, a second plate member opposing to and parallel to the first plate member, and a connecting member for connecting the first and second plate members. The first and second plate members and the connecting member define a first opening for introducing the umbilical member into the adaptor. The second includes a fixed portion fixed to an end effector and an extended portion extending from the fixed portion and offset from the third wrist axis. A second opening is formed on the extending portion of the second plate member, through which the umbilical member may extend.

5 Claims, 2 Drawing Sheets

GUIDING DEVICE FOR AN UMBILICAL MEMBER OF A ROBOT AND A ROBOT HAVING THE GUIDING DEVICE

BACKGROUND ART

1. Technical Field

The preset invention relates to a guiding device, for an umbilical member including a cable and/or a tube of an industrial robot, and to a robot having the guiding device.

2. Description of the Related Art

When an industrial robot is used for an operation, the robot is required to be provided with an umbilical member including a cable and/or a tube for transmitting power or a signal to an end effector attached to the end of a wrist element of the robot. When the umbilical member is arranged around the wrist element of a robot arm, the umbilical member may contact the arm or another external equipment and may be worn or damaged. In order to avoid such an inconvenience, several configurations has been proposed.

For example, Japanese Unexamined Patent Publication No. 2001-150382 discloses a configuration in which a clamp arranged on a suitable site near a wrist element holds an umbilical member. The clamp is attached to a point of a rotation axis of an arm such that the clamp holding the umbilical member may be rotated relative to the wrist element. As the clamp is rotated according to the motion of each axis of the wrist element, the umbilical member is prevented from winding on to the arm.

Japanese Unexamined Patent Publication No. 2003-136462 discloses that an intermediate member having a two connecting members for connecting two flanges is arranged between a wrist flange and an end effector. The umbilical member extends through the intermediate members or between the two connecting members.

Further, Japanese Unexamined Patent Publication No. 7-124886 discloses a coupling member having an opening in the center thereof, through which the umbilical member may extend. The coupling member has a generally cylindrical shape and is arranged at a rotational joint of the robot for transmitting a rotary force. One end surface, and a side surface, of the coupling member have wide openings. The umbilical member is introduced into the coupling member from the opening of the side surface and led out from the opening of the end surface.

In the configuration disclosed in Japanese Unexamined Patent Publication No. 2001-150382 in which the clamp holds the umbilical member, the umbilical member, positioned near the clamp, does not contact the arm or the wrist of the robot. However, the umbilical member positioned at a place other than near the clamp may contact the arm or the wrist. Therefore, it is necessary to loosen the umbilical member between each clamp, with the result that the loosened umbilical member may contact the external equipment. Further, in order to avoid interference between each clamp when the wrist rotates, an operating range of the wrist must be limited.

In the configuration disclosed in Japanese Unexamined Patent Publication No. 2003-136462, the rigidity of the intermediate member is low because the connecting member of the intermediate member is divided into two parts. Therefore, the end effector vibrates when the robot is activated. In order to avoid the vibration, an operating speed of the robot must be restricted, resulting in a cycle time of the operation increasing.

Further, in the configuration disclosed in Japanese Unexamined Patent Publication No. 7-124886, in which the coupling member is arranged between the wrist flange and the end effector, the coupling member has an opening on generally the center of a surface of the coupling member fixed to the end effector. When the umbilical member is arranged through the coupling member, the umbilical member must be drawn from the center of the surface fixed to the end effector, resulting in the umbilical member interfering with the end effector.

SUMMARY OF THE INVENTION

Therefore, an object of the present invention is to provide a rigid guiding device for an umbilical member for minimizing the possibility of interfere between the umbilical member and other component or equipment and a robot having the guiding device.

To this end, according one aspect of the present invention, there is provided a guiding device for supporting an umbilical member corresponding to the motion of a robot, the robot having: a forearm; wrist elements rotatably mounted to the end of the forearm; an end effector attached to one of the wrist elements; and a flexible umbilical member connected the end effector, wherein the guiding device comprises: a first plate member fixed to the wrist element; a second plate member fixed to the end effector, the second plate member opposing to the first plate member and being apart from the first plate member by at least the diameter of the umbilical member; and a connecting member for connecting the first and second plate members; and wherein the first and second plate members and the connecting member form a passage through which the umbilical member may extend; the first and second plate members and the connecting member define a first opening for introducing the umbilical member into the passage; and the second plate member has a second opening for leading out the umbilical member from the passage.

Preferably, the second opening is directed generally parallel to the rotation axis of the wrist element.

Concretely, the second plate member may include a fixed portion fixed to the end effector and an extended portion extending from the fixed portion and away from the rotation axis of the wrist element and the second opening is formed on the extending portion. In this case, the second opening is preferably formed on a side opposing to the first opening in relation to the rotation axis of the wrist element.

It is preferable that the connecting member is distant from the rotation axis of the wrist element such that the connecting member is positioned at the same side as the second opening in relation to the rotation axis.

It is preferable that the second plate member further includes a holder arranged near the second opening for holding the umbilical member.

According to another aspect of the present invention, there is provided a robot having the guiding device according to the invention.

BRIEF DESCRIPTION OF THE DRAWINGS

The above and other objects, features and advantages of the present invention will be made more apparent from the following description of the preferred embodiments thereof, with reference to the accompanying drawings, wherein:

FIG. 4b is a view indicating the state in which a third wrist element rotates by 90 degree from the state of FIG. 4a.

DETAILED DESCRIPTION

Embodiments of the invention will be described with reference to the drawings.

Figure 1:
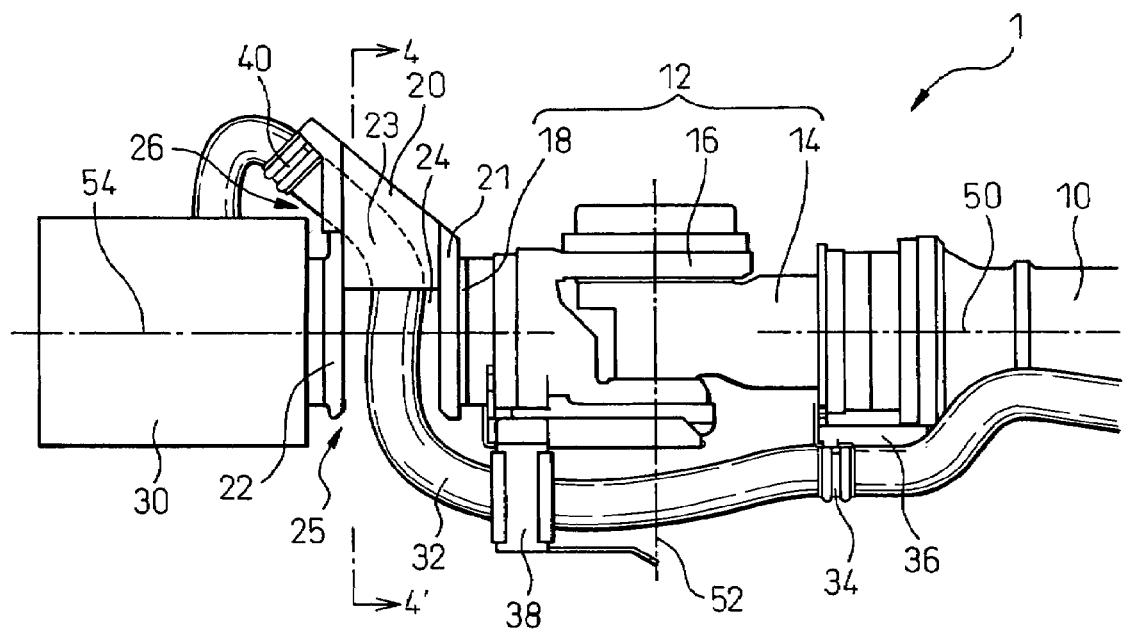
FIG. 1 is a view of a total configuration including a guiding device of the invention, indicating from a forearm to an end effector of a robot.

FIG. 1 shows a total configuration of a guiding device of the invention and indicates a robot 1 from the end of a forearm to an end effector. As shown, a wrist 12 is attached to the end of the forearm 10 of the robot 1. The wrist 12 is constituted by a first wrist element 14 mounted to the end of the forearm 10 and rotatable about a first wrist axis 50 along the longitudinal direction of the forearm 10, a second wrist element 16 mounted to the first wrist element 14 and rotatable about a second wrist axis 52 perpendicular to the first wrist axis 50 and a third wrist element 18 mounted to the second wrist element 16 and rotatable about a third wrist axis 54 perpendicular to the second wrist axis 52. A guiding device for an umbilical member or an adaptor 20 is attached to the end of the third wrist element 18. Further, an end effector 30 such as a welding gun or a handling tool is attached to the adaptor 20.

Power and a signal are sent to the end effector 30 by means of an umbilical member 32 constituted by a cable, a tube and the like. The umbilical member 32 is arranged along a base (not shown) of the robot 1, the forearm arm 10 and the wrist 12 and connected to the end effector 30.

Figure 3:
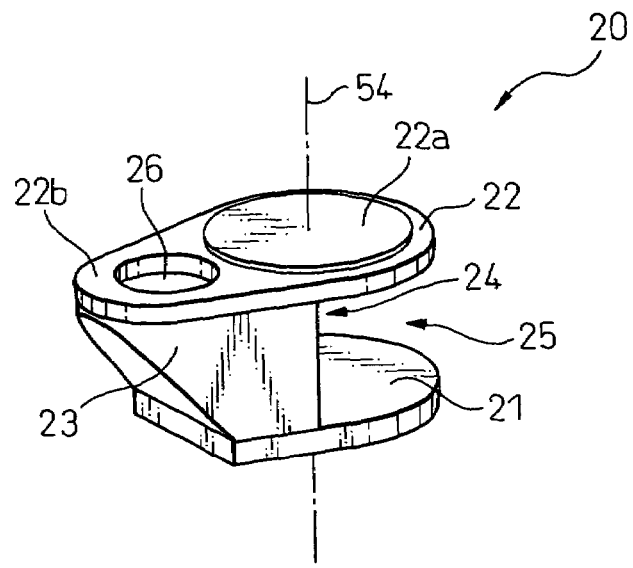
FIG. 3 is a perspective view of the guiding device.

As shown in FIGS. 1 and 3, the guiding device or the adaptor 20 includes a first plate member 21 fixed to the third wrist element 18, a second plate member 22 fixed to the end effector 30, opposing to the first plate member 21 and being apart from the first plate member 21 by at least the diameter of the umbilical member 32, and a connecting member 23 for connecting the first and second plate members 21 and 22. The first and second plate members 21 and 22 and the connecting member 23 form a passage 24 through which the umbilical member 32 may extend. The first and second plate members 21 and 22 and the connecting member 23 define an inlet or a first opening 25 for introducing the umbilical member 32 into the adaptor 20, i.e., between the first and second plate members 21 and 22. Also, as shown in FIG. 3, the second plate member 22 includes a fixed portion 22a fixed to the end effector 30 and an extended portion 22b extending from the fixed portion 22a and away from the first opening 25. Further, an outlet or a second opening 26 is formed on the extending portion 22b through which the umbilical member 32 may extend. In other words, the second opening 26 is positioned on the second plate member 22 and is offset from the third wrist axis 54 to some extent. Preferably, the second opening 26 is formed on an opposing side to the first opening 25 in relation to the third wrist axis 54 such that the umbilical member 32 introduced into the first opening 25 may be easily drawn from the second opening 26 across the third wrist axis 54.

Next, the arrangement of the umbilical member 32 will be described. As shown in FIG. 1, the umbilical member 32, arranged from the robot base (not shown) and along the forearm 10, is held by a first holder 34 arranged on the first wrist element 14. The first holder 34 may fix the umbilical member 32 or may slidably hold the umbilical member in the longitudinal direction of the umbilical member. The first holder 34 may be attached to the first wrist element 14 by means of a suitable fixture 36 as shown in FIG. 1. The fixture 36 may be fixed to the first wrist element 14 or may be configured to move along the first wrist element 14 and rotate about the first wrist axis 50. Further, the first holder 34 may be fixed to the fixture 36 or may be configured such that to rotate relative to the fixture 36 about an axis perpendicular to the first wrist axis 50.

The umbilical member 32 held by the first holder 34 extends along the second and third wrist elements 16 and 18 and is introduced into the first opening 25 of the adaptor 20. At this point, in order to avoid a drop of the umbilical member which may cause the umbilical member to excessively wind around the wrist 12 and/or contact an external equipment, a cover 38 may be arranged on the second wrist element 16 near the adaptor 20 for supporting the umbilical member 32.

Figure 2:
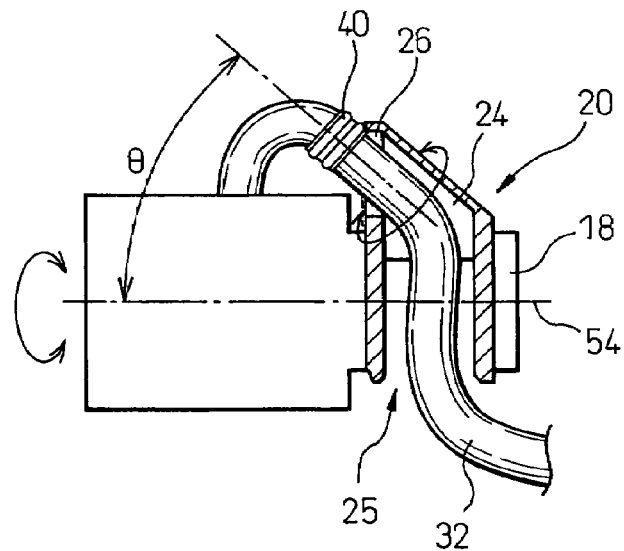
FIG. 2 is a sectional view of the guiding device of FIG. 1.
Figure 4A:
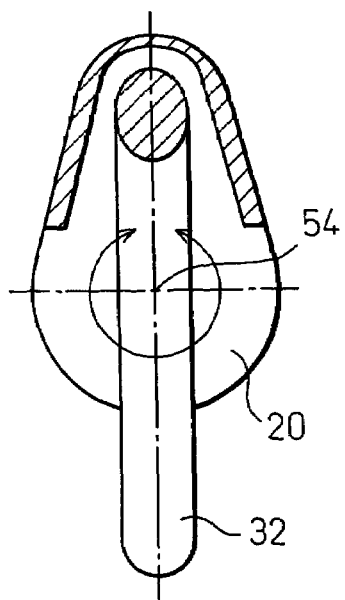
FIG. 4a is a view, along a 4-4' line of FIG. 1, indicating the motion of the umbilical member within the guiding device.
Figure 4B:
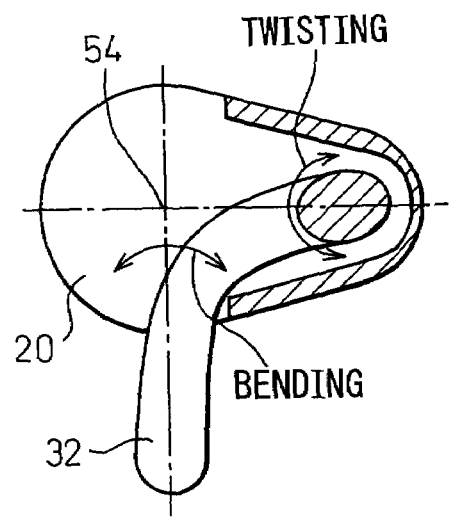

The umbilical member 32, introduced into the first opening 25 of the adaptor 20, passes through the inside or the passage 24 of the adaptor 20, across the third wrist axis 54, and is drawn from the second opening 26 of the second plate member 22 to be connected to the end effector 30. As shown in FIG. 2, the umbilical member 32 within the adaptor 20 is biased such that the umbilical member, after traversing the third wrist axis 54, is close to parallel to the third wrist axis. Due to this configuration, the motion of the umbilical member 32 caused by the rotation of the third wrist axis 54, for example from one state as shown in FIG. 4a to another state as shown in FIG. 4b, includes the twisting of the umbilical member up to the second opening 26, as well as the bending of the umbilical member within the adaptor 20. This case is more advantageous than a case in which only the bending of the umbilical member occurs, as a local strain or distortion hardly occurs in the umbilical member in the former case. Further, as the connecting member 23 is offset toward the second opening 26 relative to the third wrist axis 54, interference between the connecting member 23 and the umbilical member 32 hardly occurs when the third wrist element 18 rotates. Therefore, an operating range around the third wrist axis 54 of this case may be wider than a case in which the connecting member 23 is not offset relative to the third wrist axis 54. In addition, as shown in FIGS. 1 and 2, in order to direct the umbilical member 32, led out from the second opening 26, close to parallel to the third wrist axis 54, the umbilical member 32 is preferably held by a second holder 40 positioned on the second plate member 22 near the second opening 26.

As the second opening 26 is not formed on the connecting member 23, the rigidity of the adaptor 20 may be increased. Therefore, the vibration of the end effector 30, which may occur when the robot is operated at a high speed, may be avoided.

As the second opening 26 is formed on the second plate member 22 and offset relative to the third wrist axis 54, the workability of attaching or detaching of the end effector 30 to or from the second plate member 22 is improved. Further, as the second opening 26 is directed in the direction generally parallel to the third wrist axis 54, the umbilical member 32 led out from the second opening 26 extends closer to parallel to the third wrist axis 54. Therefore, a length of an outwardly protruding potion of the umbilical member 32 around the wrist 12 may be minimized. In the embodiment as shown in FIG. 2, an angle θ between the umbilical member 32 led out from the second opening 26 of the adaptor 20 and the third wrist axis 54 is approximately 45 degrees. However, the present invention is not limited to this embodiment. The angle θ may be varied, depending on the motion range of the third wrist axis 54, the rigidity of the umbilical member 32 based on the material of the cable constituting the umbilical member, and/or the shape of the end effector 30. As the above angle θ is closer to zero, the length of the protruding portion of the umbilical member 32 is shorter.

According to the invention, the rigidity of the connecting member between the first and second plate members may be increased more than that of the prior art, resulting in the rigidity of the guiding device, as a whole, being increased. Therefore, an undesirable vibration of the robot may be reduced or eliminated, whereby it is unnecessary to increase a cycle time of the operation by reducing an operation speed of the robot to avoid the vibration. As the second opening of the second plate member is directed in the direction generally parallel to the rotation axis of the wrist element, the length of the outwardly protruding potion of the umbilical member may be minimized. Further, as the second opening is offset relative to the rotation axis of the wrist element, the end effector may be positioned at the center of the wrist element without interference between the end effector and the umbilical member. In addition, as the connecting member is offset toward the second opening relative to the rotation axis of the wrist element, interference between the connecting member and the umbilical member may be avoided, whereby a wide operation range, for the robot, may be ensured.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. A guiding device for supporting an umbilical member corresponding to the motion of a robot, the robot comprising:
   a forearm;
   wrist elements rotatably mounted to the end of the forearm;
   an end effector attached to one of the wrist elements; and
   a flexible umbilical member connected the end effector,
   wherein the guiding device comprises:
      a first plate member fixed to the wrist element;
      a second plate member fixed to the end effector, the second plate member opposing to the first plate member and being apart from the first plate member by at least the diameter of the umbilical member; and
      a connecting member for connecting the first and second plate members;
   wherein the first and second plate members and the connecting member form a passage through which the umbilical member may extend;
   the first and second plate members and the connecting member define a first opening for introducing the umbilical member into the passage; and
   the second plate member has a second opening for leading out the umbilical member from the passage,
   and wherein the second plate member includes a fixed portion fixed to the end effector and an extended portion extending from the fixed portion and away from the rotation axis of the wrist element and the second opening is formed on the extended portion, the connecting member connects the extended portion of the second plate member to a part of the first plate member opposed to the extended portion of the second plate member.

2. The guiding device as set forth in claim 1, wherein the second opening is directed generally parallel to the rotation axis of the wrist element.

3. The guiding device as set forth in claim 1, wherein the second opening is formed on a side opposing the first opening in relation to the rotation axis of the wrist element.

4. The guiding device as set forth in claim 1, wherein the connecting member is distant from the rotation axis of the wrist element such that the connecting member is positioned at the same side as the second opening in relation to the rotation axis.

5. The guiding device as set forth in claim 1, wherein the second plate member further includes a holder arranged near the second opening for holding the umbilical member.

* * * * *